March 10, 1959 R. C. DENNISON ET AL 2,877,296
COMPOSITE COLOR SIGNAL TRANSMISSION SYSTEMS
Filed March 7, 1956 4 Sheets-Sheet 1
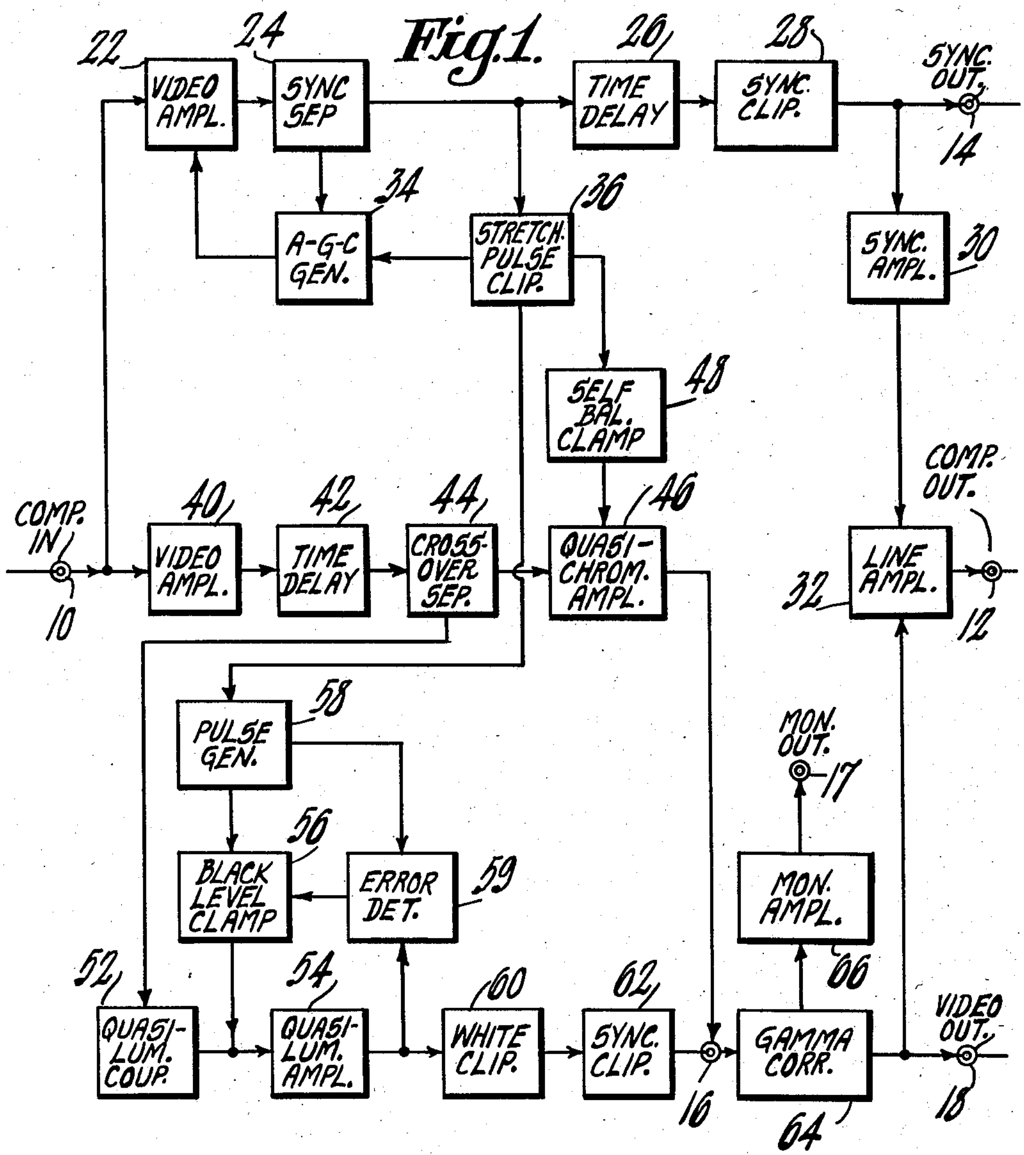
Fig.1.
KEY TO FIG.2.
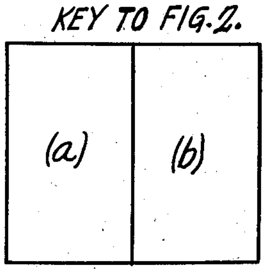
INVENTORS
Robert C. Dennison
& Arch C. Luther, Jr.
BY [signature]
ATTORNEY INVENTORS
Robert C. Dennison
& Arch C. Luther, Jr.
BY
ATTORNEY

COMPOSITE COLOR SIGNAL TRANSMISSION SYSTEMS

Filed March 7, 1956 4 Sheets-Sheet 3

INVENTORS
Robert C. Dennison
& Arch C. Luther, Jr.
BY
[signature]
ATTORNEY

COMPOSITE COLOR SIGNAL TRANSMISSION SYSTEMS

INVENTORS
Robert C. Dennison
& Arch C. Luther, Jr.
BY [signature]
ATTORNEY

United States Patent Office 2,877,296

Patented Mar. 10, 1959

2,877,296

COMPOSITE COLOR SIGNAL TRANSMISSION SYSTEMS

Robert Courtland Dennison, Westmont, and Arch Clinton Luther, Jr., Merchantville, N. J., assignors to Radio Corporation of America, a corporation of Delaware Application March 7, 1956, Serial No. 570,119

8 Claims. (Cl. 178—5.4)

Figure 2A:
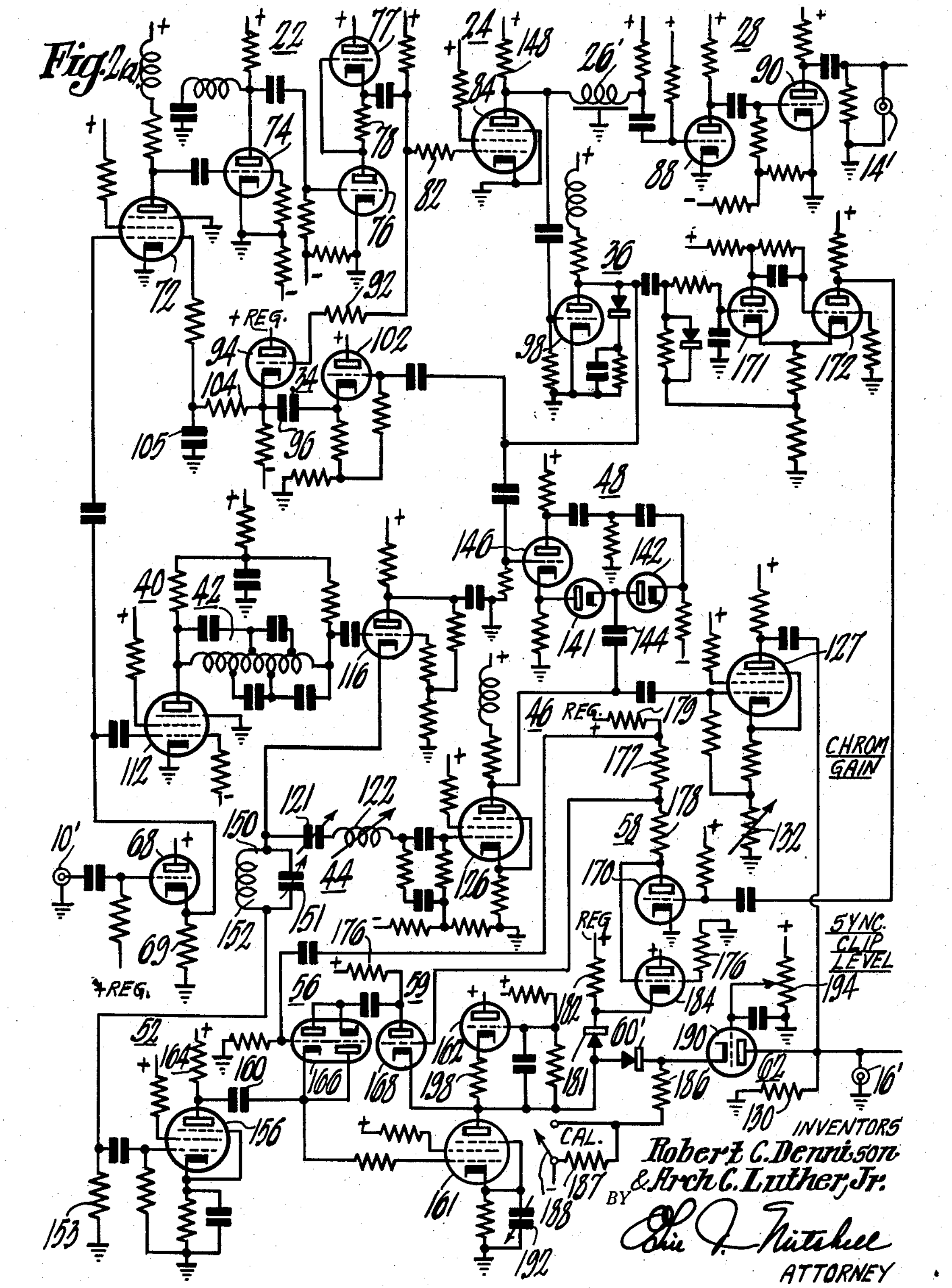

The invention relates to composite signal transmission systems and it particularly pertains to circuit arrangements for processing and eliminating undesired disturbances in the transmission of such signals, as for example, composite color television signals.

There are many applications involving composite signal transmission. One example of such an application to which the invention is applicable is found in the telemetering field. Another example of such an application is found in present day color television broadcasting.

The composite television color signal broadcast in accordance with U. S. standards, set forth in Federal Communications Commission, public notice No. 53-1663, of December 17, 1953, comprises a luminance signal, a chrominance signal, deflection synchronizing pulses, and color bursts. The luminance signal is intended to have exclusive control of the luminance of the reproduced image and so corresponds to the black-and-white, or monochrome signal. The chrominance signal consists of amplitude modulated sidebands of a pair of suppressed subcarrier wave generated in quadrature. The chrominance signal is modulated onto the subcarrier waves and when added to the luminance signal will be effective to reproduce the broadcast image in full color. The deflection synchronizing pulses are used to control the scanning of the electron beam forming the raster on the face of the kinescope in synchronism with the scanning of the electron beam in the color television camera. The color bursts, which comprise approximately eight or nine cycles of unmodulated sine wave of chrominance subcarrier frequency, follow the horizontal deflection synchronizing pulses and are employed for controlling the synchronization of the demodulating circuitry of the color television receiver by which the chrominance subcarrier is properly demodulated to realize the chrominance signal.

In present day color television systems, it is frequently desired to relay the composite color signal from one point to another for further processing. This relaying of the composite color signal often may subject a signal to various types of interference effects which tend to distort portions, or all, of the composite signal and often may attenuate the color picture signal to such an extent that the amplitude level may be too low for the signal to be used directly. In such instances, a video signal stabilizing amplifier, popularly referred to as a stab-amp, is used to modify the composite color signal as received from the remote point. In general, such stabilizing amplifiers include circuits for suitably amplifying the color picture signal, for restoring the deflection synchronizing pulses to their proper forms and amplitudes, and for removing low frequency disturbances such as tilt surges and hum.

The amplitude of the color bursts is approximately the same as that of the deflection synchronizing pulses before being modulated onto the visual carrier wave. As modulated onto the visual carrier wave, however, the color bursts swing symmetrically above and below the black level, during the interval termed the back porch.

Heretofore it has generally been considered desirable to strip the received color burst from the incoming signal and insert a new color burst derived from a local burst generating circuit. This type of stabilizing amplifier involves difficulty in maintaining a sufficiently accurate phase lock between the local generated and the incoming color bursts. Prior art stabilizing amplifiers which do not strip the color burst almost invariably introduce phase distortion so that the color image reproduced does not conform to that transmitted.

In some television stabilizing amplifiers, the composite color signal is split into quasi-luminance and quasi-chrominance components and the deflection synchronizing pulses are clipped from the quasi-luminance signal. The deflection synchronizing pulses are separated from the composite color signal in a separate circuit while the color bursts pass through the quasi-chrominance circuits without alteration. The quasi-luminance and quasi-chrominance components along with the color bursts and the deflection synchronizing pulses are then added to reconstitute the composite color signal. This technique as heretofore practiced has the disadvantage that the higher frequency components of the deflection synchronizing pulses pass through the quasi-chrominance channel and are therefore not removed by the synchronizing pulse clipping circuit which is in the quasi-luminance channel. When the clipped quasi-luminance and the quasi-chrominance signals are added back together, these high frequency components appear as undesirable voltage transients or "spikes" in the resultant output signal. Previous arrangements for eliminating these transients have been critical in adjustment and unstable in operation.

In the prior art stabilizing amplifiers the quasi-luminance channel may incorporate a limiting, or clipping circuit arranged to insure that the luminance signal does not completely extend to the white level. Primarily this clipping circuit is provided to insure optimum operation of intercarrier type television receivers. These stabilizing amplifiers also may incorporate gamma correcting circuits to insure that the light-signal transfer characteristic of the entire system is uniform despite the fact that the image pickup devices and the image reproducing devices, or kinescopes, have different characteristics. Also the prior art stabilizing amplifiers incorporate synchronizing pulse clipping circuits in the quasi-luminance channel to remove any vestiges of these pulses that may interfere with the stabilized deflection synchronizing pulses to be reintroduced. In such prior art arrangements these circuits are coupled in series for alternating current flow and clamping is required in each stage in order to maintain the proper direct component (D.-C.) level. Not only do the prior art arrangements require additional components for maintaining the proper D.-C. level but they are exceedingly difficult to adjust because waveforms or voltages indicating the proper setting are not readily available. It is obvious that misadjustment of any one of these circuits will result in improper operation of the stabilizing amplifier since they all perform non-linear operations.

It is highly desirable that synchronizing pulses be separated in a manner assuring insensitivity to the overall amplitude of the received composite color signal. Automatic gain control (A.-G.-C.) circuits previously used to maintain the level of the synchronizing pulses at the synchronizing pulse circuit nearly constant are not completely satisfactory because the tips of the synchronizing pulses are more affected than are the other portions of the pulses and of course the signal may be received with more or less than the standard synchronizing pulse level. Previous attempts to compensate for this disadvantage resulted in very critical circuits usually requiring manual readjustment when switching from one signal to another.

An object of the invention is to provide an improved stabilizing amplifier for use in color television signal broadcasting.

Another object of the invention is to provide a color television signal stabilizing amplifying circuit which is more readily adjusted and is more stable in operation than the prior art arrangements.

A further object of the invention is to provide an improved quasi-luminance channel for a stabilizing amplifier.

Another object of the invention is to provide stable means for suppressing transients in the quasi-chrominance channel of a stabilizing amplifier.

A further object of the invention is to provide an improved means for automatically maintaining the amplitude of the synchronizing portion of the composite color signal substantially constant at the input of the synchronizing pulse separating circuit.

A color television signal stabilizing amplifier incorporating circuitry according to the invention is arranged with three principal channels. The composite color signal is applied to the input of one channel to separate the deflection synchronizing pulses from the composite color signal for regeneration of these pulses. The composite color signal is also applied to another channel incorporating means to separate the composite color signal into two components with respect to frequency. One of the components comprises the band of freqencies centered about the chrominance subcarrier frequency, and is sometimes called the chrominance component. Hereinafter, however, the term quasi-chrominance component will be used to more clearly indicate that the separated signal may not exactly correspond to the transmitted chrominance subcarrier. The other component comprises the overall band of video frequencies less an intermediate band of frequencies corresponding to the quasi-chrominance band. For analogous reasons, this signal component will be referred to hereinafter as the quasi-luminance component to fully indicate that the quasi-luminance signal may not exactly correspond to the transmitted luminance signal.

According to the invention a white clipping circuit, a synchronizing pulse clipping circuit and a gamma correcting circuit are connected in series for direct current flow in the quasi-luminance channel and directly coupled to a clamping circuit for maintaining the black level of the quasi-luminance signal strictly in accordance with the black level of the received luminance signal. In this manner an oscilloscope coupled to the output of the stabilizing amplifier will indicate when the synchronizing pulse clipping circuit is properly adjusted to clip the synchronizing pulses at black level. When this adjustment is made, all other D.-C. levels automatically are simultaneously set to their proper levels.

Further according to the invention this stabilizing amplifier incorporates passive circuitry for developing a transient eliminating pulse of the proper time duration for eliminating transient voltages in the quasi-chrominance channel which are caused by component frequencies of the synchronizing pulses lying within the band of quasi-chrominance frequencies. A time delay device having a given time delay is arranged to transmit the separated deflection synchronizing pulses to synchronizing pulse amplifying circuitry and at the same time reflect a portion of the transmitted pulse image back to the input time delay device. At this point the transmitted and reflected pulses are added to form a stepped pulse of duration equal to the synchronizing pulses plus twice the given time delay which overlaps the synchronizing pulses on both edges by the given delay time. This pulse is clipped to provide a pulse of uniform amplitude which is applied to a clamping circuit coupled to the quasi-chrominance channel to clamp the circuitry in this channel to a predetermined reference level at the time the transient voltages appear, effectively suppressing them. A time delay circuit is interposed in the circuitry common to both the luminance and chrominance channels so that the regenerated synchronizing pulses, the output of the quasi-chrominance channel and the output of quasi-luminance channel may be added in the proper time relationship. This delay also insures that the transient suppressing pulse shall start before the occurrence of a chrominance channel voltage transient or "spike" due to the leading edge of a synchronizing pulse.

The regenerated deflection synchronizing pulses are freed from any effects brought about by variations in the overall amplitude of the received composite color signal by employing an automatic gain control circuit which eliminates any error due to mutilations of the deflection synchronizing pulses in transmission. This is accomplished according to the invention by a synchronizing pulse separator circuit, to which the composite color signal is applied, incorporating an electron discharge device having a control electrode circuit which is driven positive with respect to the cathode electrode during the presence of the synchronizing pulses and draws current so that the tips of the synchronizing pulses are essentially maintained at a predetermined reference potential. A charge storing device and an electron discharge structure are connected to this control electrode so that the charge stored is proportional to the peak potential at the control electrode of the synchronizing pulse separating device. An electron discharge system is used to apply separated synchronizing pulses through the charge storing device to the electron discharge structure to render the same ineffective during the time interval in which the received synchronizing pulses occur. In this manner the charge storing device is charged only to the highest potential of the composite color signal other than the synchronizing pulses, which is the black level of the composite color signal. Since the synchronizing tips are clamped to the reference potential, the black level is necessarily below reference potential or negative with respect thereto so that the potential on the charge storing device is maintained at a level proportional to the variations in synchronizing level of the incoming composite color signal and is substantially independent of the color picture signal.

Figure 2B:
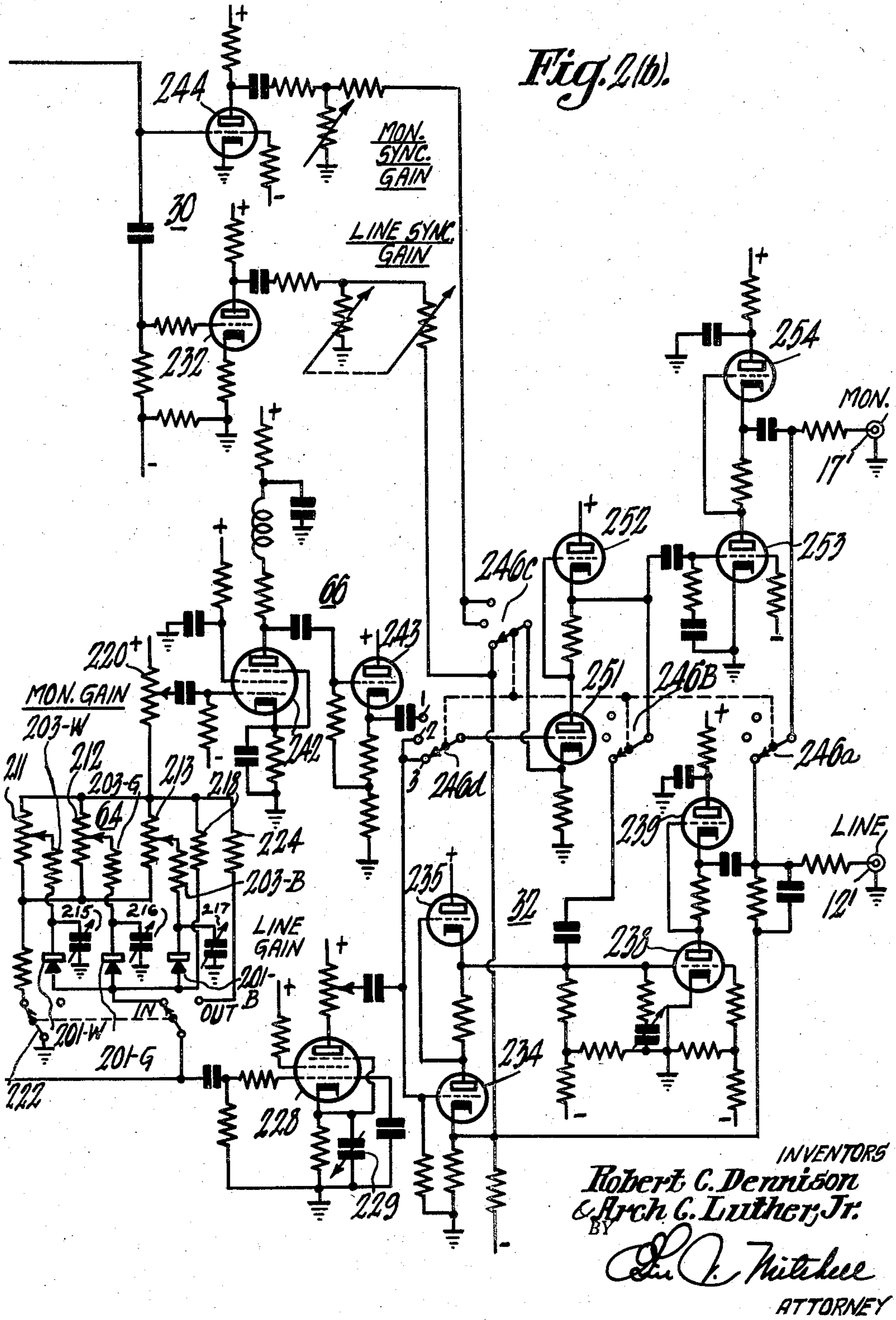
Figure 3:
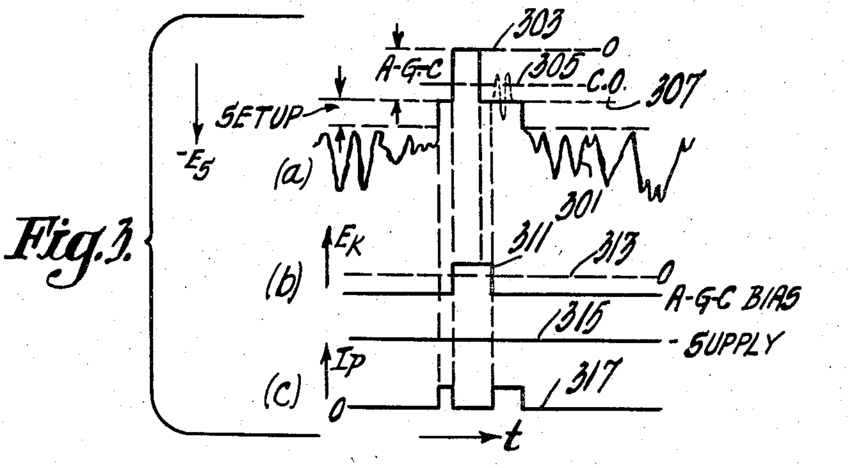
Figure 4:
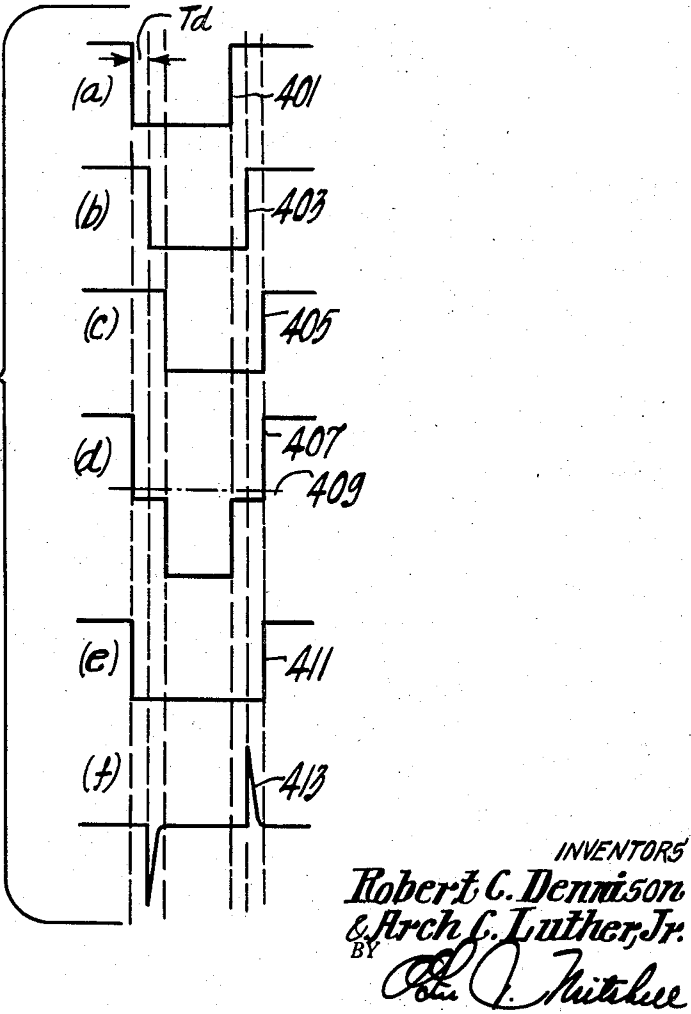

In order that the advantages of the invention may be fully applied and readily obtained in practice, an express embodiment of the invention, given by way of example, is described with reference to the accompanying drawing in which:

Fig. 1 is a functional diagram of a composite signal transmission system according to the invention;

Fig. 2 (sections *a* and *b* being taken together) is a schematic diagram of circuitry for performing the functions outlined by the diagram of Fig. 1;

Fig. 3 is a graphical representation of waveforms obtained with the automatic gain control circuit according to the invention; and Fig. 4 is a graphical representation of waveforms obtained in connection with the transient correcting pulse generating circuit according to the invention.

Referring to Fig. 1 there is shown an example of complex wave transmission system, of a type commonly known as a stabilizing amplifier for translating a composite color signal. A composite color signal as received from a remotely located source is applied to composite color signal input terminals 10. The same composite color signal is made available at composite color signal output terminals 12 with regenerated deflection synchronizing pulses and amplified color picture signals and color bursts. According to the invention this result is achieved by first separating the input composite color signal into two channels. One channel serves for operation on the deflection synchronizing pulses which may be obtained at deflection synchronizing pulses output terminals 14 for application as desired. The other channel is subdivided for handling quasi-chrominance signals and quasi-luminance signals. These signals are then recombined and are available at intermediate terminals 16. The recombined color burst and picture signal is then applied to a gamma correcting network for delivery to monitor output terminals 17 or to output color picture signal terminals 18 as desired. The color burst and picture signals as reconstituted are mixed with the deflection synchronizing signals and presented at composite color signal output terminals 12.

The deflection synchronizing signal channel comprises a video frequency amplifying circuit 22, a synchronizing signal separating circuit 24, a time delay circuit 26, and a synchronizing pulse clipping circuit 28. The stripped synchronizing pulses are then amplified in a synchronizing pulse amplifying circuit 30 and applied to a line signal amplifying circuit 32 coupled to the output terminals 12. An automatic gain control (A.-G.-C.) generating circuit 34 is coupled to the synchronizing separating circuit 24 to measure the peak potential of the input composite signal to provide a direct voltage proportional to the strength of the received composite color signal for application to the video amplifying circuit 22 in the conventional manner to maintain the input signal to the synchronizing separating circuit substantially independent of variations in the received signal strength. According to the invention the A.-G.-C. generating circuit 34 is rendered inoperative for the duration of the synchronizing pulses by gating in response to the output synchronizing pulses or from corresponding pulses obtained from a stretched pulse clipping circuit 36. The stretched pulses are of greater time duration than the separated synchronizing pulses by operation of the circuit combination according to the invention. This insures that all of the received synchronizing pulses are removed from the potential measured by the A.-G.-C. generating circuit 34 so that the most frequent of the various distortions of the synchronizing pulses do not adversely affect the input signal to the synchronizing pulse separating circuit 24. According to the invention the A.-G.-C. generating circuit 34 measures the pulse above black level by clamping the tips of synchronizing pulses to zero reference potential, or ground, and measuring the excursion of black level below the reference potential.

The received composite color signal appearing at terminals 10 is applied to a video frequency amplifying circuit 40 and delayed in time substantially equal to the time delay given the synchronizing pulses in the time delay circuit 26 by means of a further time delay circuit 42. The delayed composite color signal is then applied to a cross-over filter network 44 where the signal is divided into two components on a frequency basis. The cross-over filter network comprises components adjusted to the chrominance subcarrier and those signal components of frequency centered about the chrominance subcarrier are applied to a quasi-chrominance signal amplifier 46. The signal components translated by the quasi-chrominance amplifying circuit 46 are essentially the chrominance signal and color bursts of the composite color signal together with those portions of the luminance signal lying in the same frequency band. Because of the presence of the latter signal components, the selected signal is preferably termed the quasi-chrominance signal in the interest of clarity. Higher frequency components of deflection synchronizing pulses which were present in the composite signal are transmitted through the cross-over filter network 44 and the quasi-chrominance signal amplifying circuit 46 to form voltage transients occurring in time at the leading and trailing edges of the pulses. These voltage transients extend sufficiently far in positive and negative directions to adversely affect the output signal. According to the invention the stretched pulses obtained from the clipping circuit 36 are applied to a self balancing clamping circuit 48 to clamp the quasi-chrominance signal to reference potential for the duration of the stretched pulses developed according to the invention.

The cross-over filter network 44 delivers a video frequency wave comprising the luminance signal less those components centered about the color subcarrier frequency, which were translated in the quasi-chrominance amplifying circuit 46, together with the deflection synchronizing pulses. This signal is hereinafter termed the quasi-luminance signal in the interest of clarity. This quasi-luminance signal is applied by means of a quasi-luminance coupling circuit 52 to a quasi-luminance amplifying circuit 54. The direct component (D.-C.) of the quasi-luminance signal is reinserted by means of a black level clamping circuit 56 driven by a pulse train obtained from a clamping pulse generator 58 which is synchronized with the input composite color signal by a stretched pulse obtained from the clipping circuit 36. While the black level clipping circuit 56 may be any known circuit configuration, the feedback clamping circuit has many advantages in the stabilizing amplifier arrangement shown and an error detecting circuit 59 is coupled to the quasi-luminance amplifying circuit 54 and the pulse generating circuit 58 to produce a potential difference which is applied to the black level clamping circuit 56 to more accurately determine the black level of the quasi-luminance signal. The white level clipping circuit 60 is used to insure that the white level does not extend beyond a predetermined level of the total composite signal amplitude. This circuit is provided to insure optimum operation of intercarrier type receivers. Similar circuits are employed at the transmitter for this purpose but it is considered desirable to stabilize the white level excursions in the stabilizing amplifier where the clipping can be performed on the luminance component only. This minimizes the effects of such clipping on resolution, hue, and saturation. The deflection synchronizing pulses appearing in the incoming composite color signal are removed by means of a synchronizing clipping circuit 62 so that only the quasi-luminance components are available at the intermediate terminals 16 for addition to the quasi-chrominance signals obtained from the quasi-chrominance amplifying circuit 46. The color picture signal is subject to correction for nonlinear dynamic transfer gradiant by means of a gamma correcting circuit 64. It is necessary to introduce nonlinear amplification of a selected component color signal in the compatible color television system in order to obtain correct colorimetry. In order to insure proper image reproduction a complementary transfer gradient must be employed or the transfer gradient characteristic of intermediate apparatus be modified to achieve the desired result. According to the invention the gamma correcting circuit 64 is coupled to the synchronizing pulse clipping circuit 62 and the white level clipping circuit 60 for direct current flow whereby the black level clamping circuit 56 establishes the proper direct component (D.-C.) level for the entire quasi-luminance channel following the coupling circuit 52. This circuit arrangement greatly simplifies the adjustment of the stabilizing amplifier for proper operation. The output of the gamma correcting circuit 64 is available at the video output terminals 18 and is applied to the line signal amplifying signal 32 where the deflection synchronizing signals are inserted to present the stabilized output composite color signal at the output terminals 12. A monitor amplifying circuit 66 is arranged so as to present either the white stretched signal from the white stretcher or an unstretched signal proportional to the current flowing in the white stretcher. The latter is useful in maintaining proper video level into the white stretcher.

Examples of circuitry constituting the above described stabilizing amplifier are shown in Fig. 2. The composite color signal appearing at terminals 10 is applied to a cathode follower impedance matching tube 68. The composite color signal appearing across the cathode resistor 69 is applied to the control grid of a pentode composite signal amplifying tube 72. A triode amplifying tube 74 is coupled between the anode of the initial video frequency amplifying tube 72 and the input circuit of a series tube amplifying circuit comprising two triodes 76, 77 connected in a conventional degenerative circuit having a feedback resistance element 78 connected between the anode and cathode electrodes of the tubes respectively. The amplified video signal is applied by way of a series resistor 82 to the grid of a deflection synchronizing pulse separating tube 84. The composite color signal is applied to the grid of the separating tube 84 in positive polarity whereby the grid is driven positive with respect to the cathode in the presence of the deflection synchronizing pulses. Rectification in this grid-cathode circuit effectively clamps the tips of the synchronizing pulses at approximately zero voltage, or ground. The cut-off voltage for the tube 84 is negative and the overall gain of the amplifier circuit, including the tubes 72–77, is made sufficiently great so that the separating tube 84 passes substantially less than the entire deflection synchronizing pulse. Thus the output from the synchronizing separating tube 84 consists of a train of pulses at deflection synchronizing rate.

The deflection synchronizing pulses are applied by means of a length of delay line 26' to the input circuit of a clipping tube 88. The tips of stripped synchronizing pulses which are usually severely distorted in transmission are then clipped by the action of the clipping tube 88 and presented to a pulse amplifying tube 90 for amplification to the proper value.

The problem of obtaining clean synchronizing pulses from the synchronizing separator circuit 24 is often aggrevated by distortion in the transmission medium which causes the signal to arrive with adversely affected synchronizing pulses level and/or distorted wave shape. Usually the tips of the synchronizing pulses, are more affected so that if the clipping operation does not clip the tips of the synchronizing pulses clearly, the regenerated synchronizing pulses may not be of the proper width, shape, or timing. A.-G.-C. systems have been employed to maintain the input signal to the synchronizing pulses separating tube substantially constant. However, the distorted synchronizing pulses affect the generation of A.-G.-C. voltage in the same sense and to the same order of magnitude. According to the invention the A.-G.-C. voltage applied to the grid of the initial video frequency amplifying tube 72 is free from this difficulty by clamping the tips of the synchronizing pulses to a given reference potential, shown as ground. This clamping or D.-C. setting action is secured by rectification in the grid circuit of tube 84. The clamped signal is coupled through the series resistor 82 and a further resistor 92 to the grid of a cathode follower A.-G.-C. generating tube 94. The cathode of the A.-G.-C. tube 94 tends to follow the grid of the separating tube 84. With the tips of the synchronizing pulses established at substantially zero reference potential the A.-G.-C. tube 94 would bring the electrode of a charging capacitor 96 connected in the cathode circuit substantially to ground. However, synchronizing pulses obtained from the anode of the separating tube 84 by way of a clipping tube 98, to be described more completely hereinafter, are applied to the grid of another cathode follower tube 102. The cathode electrode of the cathode follower 102 is coupled to the cathode of the A.-G.-C. tube 94 by means of the charging capacitor 96. Thus the cathode of A.-G.-C. cathode 94 is driven positive for the duration of each synchronizing pulse and the A.-G.-C. tube 94 is blocked for this time period leaving the charge on the charging capacitor 96 proportional to the next highest peak of the composite color signal. The next highest peak is black level, of course, since the time constants of the circuit are such that the A.-G.-C. tubes substantially does not follow the color burst. With the tips of the synchronizing pulses at ground potential black level is then below ground so that the electrode of the charging capacitor 96 connected to the cathode of the A.-G.-C. tube 94 and the A.-G.-C. filter resistor 104 is negative. As the amplitude of the composite color signal increases the black level as determined by the charging capacitor 96 goes more negative applying more bias to the initial video amplifying tube 72, tending to reduce the gain, and so on as in conventional A.-G.-C. systems.

Fig. 3 is a graphical representation of waveforms obtained at pertinent points of the A.-G.-C. circuit. The composite color signal is represented by the curve 301 in Fig. 3 (*a*). The dashed line 303 represents the reference voltage which is zero, or ground potential, for the example given. The line 305 represents the cut-off potential for the separating tube 84 while the line 307 represents the black level of the composite color signal. The charge stored in the capacitor 96, is represented by the spacing between the lines 303 and 307. The cathode voltage of the A.-G.-C. tube 94 is represented by the curve 311 in Fig. 3 (*b*) with respect to the zero reference voltage, represented by the line 313, and the negative supply potential, represented by the line 315. The anode current of the A.-G.-C. tube 94 is represented by the curve 317 in Fig. 3 (*c*). Thus it is seen that the separated synchronizing pulses prevent the A.-G.-C. tube 94 from conducting for the duration of each of the synchronizing pulses. As shown in Fig. 3 the A.-G.-C. tube 94 is blocked for a period of time greater than the duration of the received synchronizing pulse as shown in Fig. 3 (*a*). According to the invention the A.-G.-C. tube blocking pulse which is the stripped synchronizing pulse may be of the same duration as the synchronizing pulse. In those applications where a pulse of greater duration than the synchronizing pulse is available, it is preferred that this stretched pulse be used as the blocking pulse so that small irregularities in black level near the leading and trailing edges of the synchronizing pulse are also eliminated from the determination of the A.-G.-C. bias voltage.

The series resistor 92 and the input capacitance of the A.-G.-C. tube 94 form an integrating circuit which integrates noise pulses in the synchronizing region in the composite color signal to lessen the tendency of the capacitor 96 to charge to an erroneous value in the presence of noise.

The composite video signal appearing across the cathode resistor 69 is applied to the control grid of a pentode video frequency amplifying tube 112. The amplified color signal is delayed in time by means of a time delay circuit 42' having a total time delay substantially equal to that of the time delay line 26'. Because of the extreme wide band of frequencies which must be translated in the quasi-chrominance channel, the time delay circuit 42' may have to be more complex than the simple length of delay cable used in the synchronizing pulse channel. Those skilled in the art will appreciate the factors involved and utilize conventional time delay circuitry as required to suit the circumstances. The amplified and delayed composite color signal is applied to the grid circuit of a cathode follower tube 116 for proper impedance matching to the cross-over filter network proper. The cathode electrode of the cathode follower tube 116 is coupled by means of an adjustable capacitor 121 and an adjustable inductor 122 forming a series resonant circuit at the chrominance subcarrier frequency to apply a quasi-chrominance signal to the input of an amplifying pentode tube 126. This tube 126 along with another pentode tube 127 constitutes the quasi-chrominance amplifying circuit 46. The output of the final amplifier tube 127 is impressed across an output load resistance element 130. The color bursts are transmitted from the cathode of the follower tube 116 to the load resistance element 130 substantially without deviation in phase and varied in amplitude to a level determined by the setting of the chrominance channel gain control 132.

This quasi-chrominance channel also translates any and all energy of the frequency lying in the quasi-chrominance channel which includes some of the higher frequency components of the deflection synchronizing pulses of the composite video signal. These latter energy components form undesirable positive-going and negative-going voltage transients occurring in time at the leading and trailing edges of the synchronizing pulses. These voltage transients, termed "spikes" by the artisan, are removed according to the invention by clamping the anode of the initial quasi-chrominance signal amplifying tube 126 to reference potential, or ground, during the portion of the blanking interval which includes the synchronizing pulses but not the color bursts. Normally the quasi-chrominance amplifier is A.-C. coupled for translating an essentially symmetrical signal, but it may be clamped during the synchronizing pulse interval since no signal is being translated at that time. The clamping circuit 48 employed for this function comprises a pair of diode elements 141, 142 connected in series with the junction point connected by means of a capacitor 144 to the anode of the quasi-chrominance amplifying tube 126. A clamp driving tube 146 is connected to the diodes 141, 142 to pass direct current through the diode elements when the control electrode of the tube 146 is positive with respect to the cathode. When the diodes conduct the junction point is effectively brought to A.-C. reference potential, shown as ground, despite any inequality of amplitude of the applied pulses. More complete details of the construction and operation of this self balanced clamping circuit may be obtained by referring to U. S. patent application Serial No. 440,747, filed 1 July 1954, for Electronic Switching Circuitry, by A. C. Luther, Jr. The drive pulses for operating the balanced clamping circuit 48 are obtained from the stretched pulse clipping tube 98. These are the same pulses which were applied to the A.-G.-C. gating tube 102 as previously described.

While in theory unstretched synchronizing pulses might be used to excite the balanced clamp driving tube, it is evident that more stable operation may be obtained with wider drive pulses. According to the invention stretched pulses are obtained by the interposition of the delay line 26′ and timed with respect to the composite color signal by means of the time delay circuit 42′. As previously stated, the separated synchronizing pulses are applied to the input terminals of the delay line 26′ for application to the synchronizing pulse clipping tube 88. Since the output terminals of the delay line 26′ are not terminated in the characteristic impedance of the line, the stripped synchronizing pulses are reflected to the input terminals and absorbed in the load resistor 148 of the separating tube 84. Referring to Fig. 4 (*a*) the curve 401 represents a stripped synchronizing pulse as impressed on the input terminals of the delay line 26′. The curve 403 of Fig. 4 (*b*) represents the same stripped synchronizing pulse appearing at the output terminals, while the curve 405 in Fig. 4 (*c*) represents the reflected stripped synchronizing pulse at the input terminals of the delay line 26′. The reflected pulse is then added to the original stripped synchronizing pulse to effect a stepped pulse as represented by the curve 407 in Fig. 4 (*d*). The line 409 represents the clipping level of the stretched pulse clipping tube 98 which operates to produce a stretched pulse as represented by the curve 411 of Fig. 4 (*e*). The curve 413 of Fig. 4 (*f*) represents the voltage transients to be suppressed. It is evident that the stretched pulse 411 is of time duration sufficiently long to clamp the quasi-chrominance amplifier channel during the period in which these voltage transient "spikes" appear. It should be noted that the stretched pulses are wider than the original stripped synchronizing pulses by twice the delay time of the delay line 26′, which is, of course, equal to that of the time delay circuit 42′. The composite color signal passes through the time delay circuit 42′ whereby the voltage transients are delayed $T_d$ seconds behind the correcting synchronizing pulse so that the stripped pulse initiates at least $T_d$ seconds before the voltage transient at the leading edge of the synchronizing pulse arrives and ends $T_d$ seconds after the trailing edge has passed. Not only is the circuit arrangement both stable and foolproof due to the use of passive circuit elements, but the width of the stretched pulses automatically changes during the equalizing-vertical synchronizing interval to the proper value to remove the "spikes" occurring in synchronism with the leading and trailing edges of these pulses.

With two delay lines of the same time delay the stabilized synchronizing pulses and the color burst and picture signals are added in the proper time relationship.

The cathode circuit of the follower tube 116 also includes a parallel resonant circuit 150 comprising an adjustable capacitor 151 and an inductor 152 and a cathode resistor 153. The circuit 150 is tuned to parallel resonance at the chrominance subcarrier frequency to present a high impedance at the same frequencies at which the series connected capacitor 121 and inductor 122 presented a low impedance. Thus these frequencies are excluded from the quasi-luminance signal which appears across the cathode resistor 153. The particular circuitry shown is not essential to cross-over filter network employed and other known circuitory may be employed instead. A more complete discussion of the considerations to be made in designing such a cross-over filter will be found in copending U. S. patent application Serial No. 325,817, filed December 13, 1952, for A Television System, by G. A. Olive and J. G. Reddick, now U. S. Patent No. 2,793,246. The quasi-luminance signal appearing across the cathode resistor 153 is applied to the input circuit of a pentode amplifying tube 156 forming a part of the quasi-luminance coupling circuit 52. The quasi-luminance signal coupling circuit 52 is shown in Fig. 2 (*a*) as comprising a pentode amplifying tube 156 and a coupling capacitor 160. If desired for impedance matching purposes a cathode follower tube may be used to provide low impedance output. In such an arrangement the input electrode of the coupling capacitor 160 would be connected to the cathode of a follower tube and to A.-C. reference potential, or ground, through a cathode resistor instead of being connected to the anode of the amplifying tube 156 and thence to A.-C. ground through the load resistor 164 as shown. In either case, however, the D.-C. must be restored. The quasi-luminance signal is applied by means of a coupling capacitor 160 to the input circuit of a series tube amplifying circuit comprising a pentode tube 161 and a triode tube 162. A cathode capacitor 192 provides high peaking to compensate for the capacitance in the anode circuit of the luminance amplifier 161. A feedback clamping circuit 56 is employed to clamp the quasi-luminance signal to black level. A dual triode tube 166 is arranged with one cathode and one anode, independent of the one cathode, connected to the output electrode of the coupling capacitor 160 and the opposing anode and cathode coupled to the anode of a clamp voltage determining or error detecting tube 168. The cathode of the error detecting tube is connected to the anode of the quasi-luminance signal amplifying tube 161 and the control grid is connected to a point on the anode load impedance element of a reference pulse generating tube 170. The control electrode of the reference pulse generating tube 170 is triggered by the trailing edges of the stretched pulses obtained from the anode of the stretched pulse clipping tube 98 by way of a cathode coupled vacuum tube circuit comprising two triodes 171, 172.

Since the clamp driving tube 170 is blocked during the pulse interval, the peak voltage at the anode is determined by the values of the resistors 176–179 and the exact values of the regulated power supply. This reference pulse is direct coupled to the grid of the error detecting tube 168 and the difference in potential between the reference pulses developed by the reference pulse generating tube 170 and the potential on the anode of the luminance signal amplifying tube 161 is developed across the load resistor 176 in the anode of the error detecting the 168. This difference or clamping potential is applied by way of the dual triode clamping tube 166 to the output electrode of the coupling capacitor 160 to bring it to the proper potential for establishing black level when the grid of the clamping tube 166 is rendered positive by a clamp driving pulse which is obtained from another point on the anode load resistance element of the pulse generating tube 170. Further details of this type of feedback clamping circuit may be found in copending U. S. patent application, Serial No. 472,021, filed November 30, 1954, for Feedback Clamping Circuit Arrangement, by A. C. Luther, Jr.

A crystal diode element 181 is connected between the anode of the luminance amplifying tube 161 and a point of regulated potential by means of a resistor 182. The diode element 181 is keyed by means of a triode tube 184 connected as a cathode follower to apply a highly positive pulse for the duration of the clamping pulse. This circuit thus is effective to eliminate transients during the synchronizing pulse interval but is disabled during the clamping interval when it would impair the clamping efficiency. This transient eliminating circuit is otherwise conventional and need not be described further.

A series connected crystal diode element 60′ and a pair of resistors 186, 187 are connected to clip white going excursions of the quasi-luminance signal at the prescribed level, which is 12.5±2.5 percent of peak carrier level under present Federal Communications Commission standards. If the anode potential of the luminance amplifier tube 161 drops in response to the signal proceeding in the white direction, the voltage across the crystal element 60′ drops until it reaches zero. When the crystal element 60′ stops conducting, the current through the synchronizing pulse clipping tube 190, and hence in the principal output load resistor 218, levels off at the instantaneous value of current flowing through a pair of series connected resistors 186, 187. A switch 188 is arranged to short out the latter resistor 187, for calibrating the circuit by causing the white clipper to clip at the white level instead of the 12.5 percent level. If there is considerable stray capacitance between the cathode of the clipper tube 190 and ground and substantial forward resistance of the crystal diode element 60′, some undesirable phase-shift may be experienced at the higher frequency components of the signal. This may be compensated by connecting an adjustable capacitor, of say 8–50 mmf., in parallel with the crystal diode element 60′. An important feature of this circuit arrangement is the fact that white luminance signal peaks are clipped but the detail or resolution components are not clipped since they pass through the quasi-chrominance channel. Thus accidental misadjustment of the white clipping level or misadjustment of the signal level will produce errors only in the grey scale and average scene brightness with very little degradation of resolution.

The synchronizing pulse clipping tube 190 is direct coupled to the white clipping diode element 60′ and the polarity of the quasi-luminance signal at this point is such that the synchronizing pulses extend in the positive direction, tending to reduce the current flowing through the synchronizing clipping tube 190. By means of a potentiometer 194 the grid of the clipping tube 190 is biased so that the tube cuts off at black level leaving only the video quasi-luminance components at the anode of the clipping tube 190. The quasi-chrominance signal is added in the anode circuit of the clipping tube 190 in the proper proportion, as determined by the setting of the quasi-chrominance gain control 132, to reconstitute the composite color signal complete with color burst but less the deflection synchronizing pulses. The clipping tube 190 is a triode, rather than a diode, because a diode would conduct on extra-black excursions (color overshoots) of the quasi-chrominance components, resulting in signal distortion. Further details of such triod clipping circuits may be found in copending U. S. patent application, Serial No. 395,435, filed December 1, 1953, for Stabilized Clipper and Clamp Circuit, by A. C. Luther, Jr.

The recombined color burst and picture signal is applied to a gamma correcting circuit 64 which operates on the principles set forth in copending U. S. patent application, Serial No. 429,014, filed May 11, 1954, for Image Signal Correction Apparatus, by A. C. Luther, Jr. and I. Bosinoff, and modified according to the invention to provide direct current path from the input to the output. This gamma correcting network, frequently termed a "white stretcher" by those skilled in the art, is essentially a nonlinear network containing a plurality of diode elements 201 biased to conduct at different signal levels. As each diode conducts, additional resistance is shunted across the principal load resistor 218 thereby causing a change in the slope in the transfer characteristic of the amplifier. As shown in Fig. 2(*b*) the gamma correcting network comprises three crystal diodes 201–W, 201–G and 201–B arranged to connect auxiliary load resistors 203–W, 203–G and 203–B into the circuit at "white, grey and black" signal levels determined by the adjustment of the arms 210 on the respective potentiometers 211, 212 and 213. Trimmer capacitors 215, 216, 217 are switched in simultaneously with the switching of the auxiliary load resistors to maintain the time constant of the anode load circuit of the amplifier tube substantially constant.

Resistor R130 provides a bias which prevents the crystal diodes from conducting on the excursions of burst which extend in the extra-black region.

By keeping the maximum resistance of the gamma correcting circuit 64 relatively low, on the order of a few hundred ohms, the impedance at the chrominance subcarrier frequency is essentially the same as the direct current resistance so that chrominance components are corrected in the same proportion as the luminance components.

With the exception of slight displacement currents flowing in the capacitors 215, 216 and 217, all of the current in the gamma correcting network flows through a common resistance element 220. Since this current is supplied by constant current devices, that is, the amplifying circuit comprising the tube 161, and the pentode tube 127, both of which are essentially constant current devices, the signal developed across the common resistance element 220 is an uncorrected signal and may be used to monitor the level of the signal in the gamma correcting circuit 64. A switch 222 is arranged for disconnecting the gamma correcting circuit at will. By proper choice of value for a substitute resistor 224, the average gain of the circuit may be maintained substantially constant in the absence of the gamma correcting circuit.

Any roll off at the high frequencies due to capacitance loading may be compensated by high peaking in the amplifying stage comprising the amplifier tube 228 by employing an adjustable capacitor 229 in the cathode circuit.

With the direct current connections of the amplifying, white clipping, synchronizing pulse clipping and gamma correcting circuits according to the invention only one clamping circuit 56 is required to set the proper D.-C. levels for three circuit functions which must be referred to black level. Setting the clipping of the synchronizing pulses at black level is easily and accurately accomplished by observing the signal on an oscilloscope as the synchronizing clipping level potentiometer 194 is adjusted. This automatically establishes the correct D.-C. level at the gamma correcting circuit and eliminates what would otherwise be difficult adjustments in other circuit arrangements. The stripped synchronizing pulses are amplified by means of a triode tube 232 and added to the signal in the cathode circuit of a line amplifier stage comprising a pair of series connected tubes 234, 235. The signal at the cathode of the tube 235 is the stabilized composite color signal which is further amplified in another line amplifier stage having two tubes 238, 239 connected in series for presenting the stabilized composite color signal to the line output terminals 12'. The uncorrected signal appearing across the common resistor 220 is applied to a monitor amplifier tube 242. Stripped synchronizing signals are amplified in a monitor synchronizing pulse amplifying tube 244. Monitor output terminals 17' are selectively connected by means of a switch 246 having four sections for monitoring in three positions: (1) the uncorrected output, (2) the corrected output, and (3) the corrected output together with the output of the line amplifiers. With this simple switching arrangement the conventional monitor used in color television studios may be used to monitor all of the pertinent signal transfer points of the stabilized amplifier circuit arrangement of the invention.

Those skilled in the art will determine from the teachings herein the proper values of components to be used in applying the invention to practice, however, the values listed below, which were used in a stabilizing amplifier constructed as shown in the schematic diagrams of Fig. 2 are offered as a convenient guide.

| Ref. No. | Component | Type or Value |
|---|---|---|
| 68 | Input cathode follower | 12AT7 (par.). |
| 69 | Cathode resistor | 18 Kilohms. |
| 72, 74 | Pentode-triode amplifier | 6U8. |
| 76, 77 | Series amplifier tubes | 6BQ7A. |
| 82 | Series resistor | 220 Ohms. |
| 84 | Sync. sep. tube | 1/s. 6AW8. |
| 88 | Clipping tube | 1/s. 12AT7. |
| 90 | Sync. pulse amplifier | 1/s. 6BQ7A. |
| 92 | Series resistor | 47 ko. |
| 94 | A.-G.-C. generating tube | 1/s. 12AX7. |
| 96 | Charging capacitor | 0.047 mf. |
| 98 | Clipping tube | 1/s. 6AW8. |
| 102 | A.-G.-C. blocking tube | 1/s. 12AX7. |
| 104 | A.-G.-C. filter resistor | 1 Mego. |
| 105 | A.-G.-C. filter capacitor | 0.068 mf. |
| 112, 116 | Pentode-triode tube | 6U8. |
| 121 | Adjustable capacitor | 75–125 mmf. |
| 122 | Adjustable inductor | 22.23 μh. |
| 126 | Pentode amplifier tube | 1/s. 6AW8. |
| 127 | do | 6CL6. |
| 130 | Bias resistor | 39 ko. |
| 132 | Chrominance channel gain control | 1 ko. |
| 141, 142 | Clamp diodes | 6AL5. |
| 146 | Clamp driving tube | 1/s. 6BQ7. |
| 148 | Load resistor | 2700 Ohms. |
| 151 | Adjustable capacitor | 75–125 mmf. |
| 152 | Inductor | 22.23 μh. |
| 153 | Cathode resistor | 500 Ohms. |
| 156 | Luminance amplifier tube | 6AN8. |
| 160 | Coupling capacitor | 0.001 mf. |
| 161 | Pentode series tube | 6CL6. |
| 162 | Triode series tube | 1/s. 5687. |
| 164 | Anode resistor | 820 Ohms. |
| 166 | Clamping tube | 12AX7. |
| 168 | Clamp detector tube | 1/s. 6AW8. |
| 170 | Ref. pulse generator tube | 1/s. 12AT7. |
| 176 | Anode resistor | 150 ko. |
| 177, 178 | do | 1 ko. |
| 179 | do | 470 Ohms. |
| 181 | Transient suppressor diode | 1N34A. |
| 182 | Diode bias resistor | 470 Ohms. |
| 184 | Suppressor drive tube | 1/s. 5687. |
| 186 | Clipping level resistor | 47 ko. |
| 187 | do | 5.6 ko. |
| 190 | Sync. pulse clipper tube | 12AX7 (par.). |
| 194 | Sync. clip. level control | 50 ko. |
| 198 | Bias resistor | 1 ko. |
| 201 | Gamma correcting diodes | 1N34A. |
| 203W | Shunt load resistor | 150 Ohms. |
| 203G | do | 300 Ohms. |
| 203B | do | 510 Ohms. |
| 211 | "White" stretch potentiometer | 200 Ohms. |
| 212 | "Grey" stretch potentiometer | 250 Ohms. |
| 213 | "Black" stretch potentiometer | 500 Ohms. |
| 215 | Correction capacitor | 10–100 mmf. |
| 216 | do | 8–50 mmf. |
| 217 | do | 6–25 mmf. |
| 220 | Monitor gain control | 50 Ohms. |
| 224 | Substitute resistor | 560 Ohms. |
| 228 | Line amplifier tube | 6CL6. |
| 232-244 | Sync. pulse amplifier tubes | 12AT7. |
| 234, 235 | Line amplifier tubes | 6BQ7A. |
| 238, 239 | do | 6BX7GT. |
| 242, 243 | Monitor amplifier tubes | 6AN8. |
| 251, 252 | do | 6BQ7A. |
| 253, 254 | do | 6BX7GT. |

The power supply delivered 280 volts positive between the points marked with a plus (+) sign and the point of neutral potential, shown as ground, and 150 volts regulated between the points marked + Reg. and the point of neutral potential.

The invention claimed is:

1. A color television signal transmission system including, a composite signal input circuit to which a composite color signal is applied, a composite signal output circuit at which is available an amplified and processed composite color signal corresponding to said applied composite color signal, a color picture signal separating circuit having an input coupled to said composite signal input circuit and having an output at which a quasi-luminance signal is available, a quasi-luminance signal amplifying circuit having an input and an output, means coupling the input of said quasi-luminance signal amplifying circuit for alternating current flow to said quasi-luminance signal output, a white clipping circuit, a synchronizing pulse clipping circuit and a gamma correcting circuit all connected in series for direct current flow between the output of said quasi-luminance signal amplifying circuit and said composite output circuit, a clamping circuit connected to the junction between said coupling means and the input of said quasi-luminance signal amplifying circuit and to the output of said quasi-luminance signal amplifying circuit, a composite synchronizing signal separating circuit having an input coupled to said composite signal input circuit and having an output coupled to said composite output circuit and at which output the synchronizing pulses of the applied composite signal are available, a driving pulse generating circuit coupled to said composite synchronizing pulse separating circuit to produce a train of driving pulses in timed relationship to the synchronizing pulses, and means coupled between said driving pulse generating circuit and said clamping circuit to apply said driving pulses to said clamping circuit to clamp the quasi-luminance signal to a predetermned direct current level.

2. A color television signal transmission system including, a composite signal input circuit to which a composite color signal is applied, a composite signal output circuit at which is available an amplified and processed composite color signal corresponding to said applied composite color signal, a color picture signal separating circuit having an input coupled to said composite signal input circuit and having an output at which a quasi-luminance signal is available, a quasi-luminance signal amplifying circuit having an input and an output, means coupling the input of said quasi-luminance signal amplifying circuit for alternating current flow to said luminance signal output, a white clipping circuit, a synchronizing pulse clipping circuit and a gamma correcting circuit all connected in series for direct current flow between the output of said quasi-luminance signal amplifying circuit and said composite output circuit, a feedback clamping circuit connected to the junction between said coupling means and the input of said quasi-luminance signal amplifying circuit and to the output of said quasi-luminance signal amplifying circuit, a composite synchronizing signal separating circuit having an input coupled to said composite signal input circuit and having an output coupled to said composite output circuit and at which output the synchronizing pulses of the applied composite signal are available, a driving pulse generating circuit coupled to said composite synchronizing pulse separating circuit to produce a train of driving pulses in timed relationship to the synchronizing pulses, a clamping error detecting circuit coupled to the output of said quasi-luminance signal amplifying circuit and to said driving pulse generating circuit to produce a clamping level pulse, said error circuit being also coupled to said clamping circuit to apply said clamping level pulse to clamp the luminance signal to a predetermined level.

3. A color television signal transmission system including, a composite signal input circuit to which a composite color signal is applied, a composite signal output circuit at which is available an amplified and processed composite color signal corresponding to said applied composite color signal, a color picture signal separating circuit having an input coupled to said composite signal input circuit, one output at which a quasi-chrominance signal is available coupled to said composite output signal circuit and another output at which a quasi-luminance signal is available, a quasi-luminance signal amplifying circuit having an input and an output, means coupling the input of said quasi-luminance signal amplifying circuit for alternating current flow to said other quasi-luminance signal output, a white clipping circuit, a synchronizing pulse clipping circuit and a gamma correcting circuit all connected in series for direct current flow between the output of said quasi-luminance signal amplifying circuit and said composite output circuit, a feedback clamping circuit connected to the junction between said coupling means and the input of said quasi-luminance signal amplifying circuit and to the output of said quasi-luminance signal amplifying circuit, a composite synchronizing signal separating circuit having an input coupled to said composite signal input circuit and having an output coupled to said composite output circuit and at which output the synchronizing pulses of the applied composite signal are available, a driving pulse generating circuit coupled to said composite synchronizing pulse separating circuit to produce a train of driving pulses in timed relationship to the synchronizing pulses, a clamping error detecting circuit coupled to the output of said luminance signal amplifying circuit and to said driving pulse generating circuit to produce a clamping leveling pulse and coupled to said clamping circuit to apply said clamping leveling pulse circuit to clamp the quasi-luminance signal to black level.

4. A color television signal transmission system including, a composite signal input circuit to which a composite color signal is applied, a pair of color signal output terminals at which is available an amplified and processed composite color signal corresponding to said applied composite color signal, a color picture signal separating circuit having an input coupled to said composite signal input circuit, one output at which a quasi-chrominance signal is available and which output is coupled to said color signal output terminals and another output at which a quasi-luminance signal is available, a quasi-luminance signal amplifying circuit having an input and an output, means coupling the input of said quasi-luminance signal amplifying circuit for alternating current flow to said quasi-luminance signal output, a clipping circuit comprising means including a unilateral impedance device having an element connected for direct current flow to said output of said quasi-luminance signal amplifying circuit and another element coupled to said color signal output terminals, means connected to an element of said unilateral impedance device to apply a potential thereto proportional to the signal level beyond which conduction in a given direction is to be prevented, and a transmission characteristic varying network connected across said color signal output terminals for direct current flow and comprising a number of semi-conductor diode structures having an electrode connected in common to one of said color signal output terminals and to one terminal of a resistance element, a number of resistance elements each having one terminal connected in common and another terminal individually connected for direct current flow to the other electrode of one of said number of diode structures, means to apply direct potential between the other of said color signal output terminals and the common connection of said resistance elements, said resistance elements having values at which said diode structures conduct at different signal levels, and means connected at the input of said quasi-luminance signal amplifying circuit to clamp the signal transmitted to said color signal output terminals to a predetermined level during a predetermined time interval.

5. A color television signal transmission system as defined in claim 4 and wherein said clamping means includes a synchronizing pulse separating circuit connected to said composite signal input circuit to derive pulses corresponding to the synchronizing pulses of the applied composite signal, a clamping circuit and means to apply said derived pulses to said clamping circuit to control the clamping.

6. A color television signal transmission system including, a composite signal input circuit to which a composite color signal is applied, color signal output terminals at which is available an amplified and processed composite color signal corresponding to said applied composite color signal, a color picture signal separating circuit having an input coupled to said composite signal input circuit, one output at which a quasichrominance signal is available and which output is coupled to said color signal output terminals and another output at which a quasi-luminance signal is available, a quasi-luminance signal amplifying circuit having an input and an output, means coupling the input of said quasi-luminance signal amplifying circuit for alternating current flow to said quasi-luminance siginal output, a clipping circuit comprising means including a pair of unilateral impedance elements each having anode and cathode electrodes connected in back-to-back relationship for direct current flow between said output of said quasi-luminance signal amplifying circuit and said color signal output terminals, means to apply negative direct potential to one of said unilateral impedance elements to prevent further conduction beyond a signal level more negative than the potential at said one element, means connected to the other of said unilateral impedance elements to apply a positive potential thereto proportional to the signal level beyond which conduction in the positive direction is to be prevented, and a gamma correcting network connected across said color signal output terminals for direct current flow and comprising a number of semi-conductor diode structures each having an electrode connected in common to one of said color signal output terminals and to one terminal of a resistance element, a number of resistors each having one terminal connected in common and another terminal individually connected for direct current flow to the other electrode of one of said number of diode structures, means to apply direct potential between the other of said color signal output terminals and the common connection of said resistors and the other terminal of said resistance element, and adjustable capacitors individually connected between said other terminal of said color signal output terminals and said other electrodes of said semi-conductor structures, said resistors having values at which said diode structures conduct at different signal levels to vary the impedance across said color signal output terminals as a function of signal amplitude, and means connected at the input of said quasi-luminance signal amplifying circuit to clamp the signal transmitted to said color signal output terminals to a predetermined level during a predetermined time interval.

7. A color television signal transmission system including, a composite signal input circuit to which a composite color signal is applied, color signal output terminals at which is available an amplified and processed composite color signal corresponding to said applied composite color signal, a color picture signal separating circuit having an input coupled to said composite signal input circuit, one output at which a quasi-chrominance signal is available and which output is coupled to said color signal output terminals and another output at which a quasi-luminance signal is available, a quasi-luminance signal amplifying circuit having an input and an output, means coupling the input of said quasi-luminance signal amplifying circuit for alternating current flow to said quasi-luminance signal output, a white clipping circuit comprising means including a diode element having an anode connected for direct current flow to said output of said quasi-luminance signal amplifying circuit and a cathode and means to apply negative direct potential to said cathode element to prevent further conduction beyond a signal level more negative than the potential at said cathode element, a synchronizing pulse clipping circuit comprising means including a triode electron discharge device having at least a cathode element connected to the anode of said diode element, a control element and an anode element coupled to said color signal output terminals, adjustable meaans connected to said control element to apply a potential thereto proportional to the signal level beyond which conduction in the positive direction is to be prevented, and a gamma correcting network connected across said color signal output terminals for direct current flow and comprising a number of semiconductor diode structures having an electrode connected in common to one of said color signal output terminals and to one terminal of a resistance element, a number of potentiometers each having one terminal connected in common to the other terminal of said color signal output terminals, another terminal connected in common to the other terminal of each of the other potentiometers and the other terminal of said resistance element and an arm individually connected for direct current flow to the other electrode of one of said number of diode structures, means to apply direct potential between the other of said color signal output terminals and the common connection of said potentiometers and resistance element, and adjustable capacitors individually connected between said other terminal of said color signal output terminals and said other electrodes of said semi-conductor structures, said arms being adjusted to render said diode structures conducting at different signal levels to vary the amplitude-transmission characteristic of said television signal transmission system, and means connected at the input of said quasi-luminance signal amplifying circuit to clamp the signal transmitted to said color signal output terminals to a predetermined level during a predetermined time interval, said clamping means including a synchronizing pulse separating circuit connected to said composite signal input circuit to derive pulses corresponding to the synchronizing pulses of the applied composite signal, a clamping circuit and means to apply said derived pulses to said clamping circuit.

8. In a color television signal transmission system which couples a composite signal input circuit to which a composite color signal is applied to a composite signal output circuit at which is available an amplified and processed composite color signal corresponding to said applied composite color signal but from which undesired disturbances have been eliminated, the combination of a color picture signal separating circuit having an input coupled to said composite signal input circuit and having an output at which a quasi-luminance signal is available, a quasi-luminance signal amplifying circuit having an input and an output, means coupling the input of said quasi-luminance signal amplifying circuit for alternating current flow to said quasi-luminance signal output, a white clipping circuit, a synchronizing pulse clipping circuit and a gamma correcting circuit all connected in series for direct current flow between the output of said quasi-luminance signal amplifying circuit and said composite output circuit, a clamping circuit connected to the junction between said coupling means and the input of said quasi-luminance signal amplifying circuit and to the output of said quasi-luminance signal amplifying circuit, and means including a synchronizing signal separating circuit coupled to said composite signal input circuit for driving said clamping circuit in response to the synchronizing pulses of the applied composite signal to clamp the quasi-luminance signal to a predetermined level, whereby said clamping means sets the direct current level of each of said series connected circuits.

References Cited in the file of this patent

UNITED STATES PATENTS 2,793,246 Olive et al. -------------- May 21, 1957